United States Patent
Kozlov

(10) Patent No.: US 9,946,903 B2
(45) Date of Patent: Apr. 17, 2018

(54) AUTHENTICITY VERIFICATION SYSTEM AND METHODS OF USE

(71) Applicant: Vladimir Kozlov, Newhall, CA (US)

(72) Inventor: Vladimir Kozlov, Newhall, CA (US)

( * ) Notice: Subject to any disclaimer, the term of this patent is extended or adjusted under 35 U.S.C. 154(b) by 0 days.

(21) Appl. No.: 15/467,968

(22) Filed: Mar. 23, 2017

(65) Prior Publication Data

US 2017/0277919 A1 Sep. 28, 2017

Related U.S. Application Data

(60) Provisional application No. 62/312,913, filed on Mar. 24, 2016.

(51) Int. Cl.
| G06K 5/00 | (2006.01) |
| G06K 7/10 | (2006.01) |
| G06Q 30/00 | (2012.01) |

(52) U.S. Cl.
CPC ..... G06K 7/10297 (2013.01); G06Q 30/0185 (2013.01)

(58) Field of Classification Search
CPC ........... G06K 7/10297; G06K 7/10257; G06Q 30/0185; G06Q 30/018; H04L 9/3271; H04L 9/3226; G11B 20/00115; H04B 5/0062
See application file for complete search history.

(56) References Cited

U.S. PATENT DOCUMENTS

| 7,532,122 | B2 | 5/2009 | Aull et al. |
| 7,602,291 | B2 | 10/2009 | Tseng et al. |
| 7,750,793 | B2 | 7/2010 | Juels |
| 7,941,832 | B2 | 5/2011 | Tsutsui et al. |
| 8,078,875 | B2 | 12/2011 | Cowburn et al. |
| 8,154,405 | B2 | 4/2012 | Gravelle et al. |
| 8,212,651 | B2 | 7/2012 | Bauchot et al. |
| 8,458,474 | B2 | 6/2013 | Robshaw et al. |
| 8,683,210 | B2 | 3/2014 | Devadas |
| 8,896,420 | B2 | 11/2014 | Chang et al. |
| 8,917,165 | B2 | 12/2014 | Marques et al. |
| 8,938,615 | B2 | 1/2015 | Neill et al. |
| 8,942,372 | B2 * | 1/2015 | Kaulartz ............ G06Q 10/0833 235/375 |
| 9,213,871 | B1 | 12/2015 | Diorio et al. |
| 9,231,947 | B2 | 1/2016 | Fairbanks et al. |
| 9,489,785 | B2 | 11/2016 | Klammer et al. |
| 9,501,675 | B1 | 11/2016 | Diorio et al. |

(Continued)

*Primary Examiner* — Claude J Brown

(74) *Attorney, Agent, or Firm* — Entralta P.C.; Justin G. Sanders; Peter D. Weinstein

(57) ABSTRACT

A system and associated methods for dynamically authenticating an at least one object are disclosed. In at least one embodiment, upon a user desiring to verify the authenticity of a given object via an at least one user device, a public identifier of a corresponding rewritable memory device attached to the object is obtained by the user device and transmitted to a central computing system. Upon determining that the public identifier is present in an at least one database maintained by the central computing system, select details related to the object, as stored in the at least one database, are transmitted to the user device. Additionally, a new public identifier is generated and transmitted to the corresponding rewritable memory device of the object so as to overwrite the previous public identifier stored thereon.

20 Claims, 5 Drawing Sheets

(56) References Cited

U.S. PATENT DOCUMENTS

| | | |
|---|---|---|
| 2002/0005774 A1 | 1/2002 | Rudolph et al. |
| 2006/0294583 A1 | 12/2006 | Cowburn et al. |
| 2007/0194879 A1 | 8/2007 | Backes et al. |
| 2008/0098469 A1 | 4/2008 | Morijiri et al. |
| 2008/0309497 A1* | 12/2008 | Bryant .................. G06K 19/04 340/572.8 |
| 2009/0096574 A1 | 4/2009 | Oberle |
| 2010/0001840 A1 | 1/2010 | Kang et al. |
| 2010/0079243 A1 | 4/2010 | Hamada |
| 2010/0150348 A1 | 6/2010 | Fairbanks et al. |
| 2011/0291803 A1 | 12/2011 | Bajic et al. |
| 2013/0097085 A1* | 4/2013 | Peckover ............. G06Q 30/018 705/50 |
| 2013/0124854 A1 | 5/2013 | Kato et al. |
| 2014/0359746 A1 | 12/2014 | Tezuka et al. |
| 2015/0002260 A1 | 1/2015 | Brown |
| 2016/0110571 A1 | 4/2016 | Jung et al. |
| 2016/0117685 A1* | 4/2016 | Bassi .................. G06Q 30/018 705/318 |

\* cited by examiner

AUTHENTICITY VERIFICATION SYSTEM AND METHODS OF USE

RELATED APPLICATIONS

This application claims priority pursuant to 35 U.S.C. § 119(e) to and is entitled to the filing date of U.S. provisional application Ser. No. 62/312,913, filed on Mar. 24, 2016 and titled "Authenticity Verification System." The contents of the aforementioned application are incorporated herein by reference.

BACKGROUND

The subject of this patent application relates generally to authentication systems, and more particularly to an authenticity verification system and associated methods of use for dynamically authenticating a given physical or virtual object via a rewritable memory device attached to said object.

Applicant(s) hereby incorporate herein by reference any and all patents and published patent applications cited or referred to in this application.

By way of background, in today's highly competitive global marketplace, counterfeiting has become a sad reality. With the ever increasing availability of technological means to malicious entities, many items in our everyday life have become targets for counterfeiting. To name a few, currencies, name brands, general consumer goods, pharmaceuticals, foods, beverages, legal documents, certificates of achievements, and personal identification cards are all targeted and successfully reproduced by such malicious entities to their financial benefit and the deception of the general public.

The ability to determine the genuineness of an item or product has become a requirement in modern commerce. For example, there are many companies, especially high-end name brand companies, whose products are purchased mainly because of consumer recognition of the company name. Consumers trust that products manufactured by a well-known, established companies will meet a certain level of quality. As a result of this, unscrupulous or criminal companies and individuals make copies or knock-offs of these name brand products. Therefore, the actual name brand companies/manufacturers must take measures to establish that products sold under their name are genuine.

This phenomena leaves the average person unaware and vulnerable to counterfeits. In cases of ingestibles, such as pharmaceuticals and food products, counterfeits pose real public health risks, in addition to financial waste for consumers and manufacturers.

Intellectual property is up for the grab of the criminal entities, leaving the honest and creative companies with enormous financial loss and frustration that hinders further innovation.

This problem is even more prevalent in second and third world countries where labor and materials are less expensive and intellectual property laws are looser and frequently not enforced. The counterfeit items are often extremely hard to distinguish from originals, making the unaware consumers victims of fraud.

There have been numerous attempts to solve this counterfeiting problem. One such method is the attachment of a radio frequency identification ("RFID") tag to an item. The RFID tag contains a unique ID that can be scanned by an authenticating device and verified against a database to establish its authenticity. While this method has been somewhat effective, there is still an inherent problem associated with the use of RFID tags. The tag itself can be reverse engineered and cloned an infinite number of times. All fraudulent copies would still be recognized by the authenticating device as authentic, thus implying that the underlying item is authentic as well. While it may not be a simple task to hack and clone a protected RFID tag or other rewriteable memory device, it is technically feasible. The process of hacking and cloning is a "one-time investment" for the malicious entity. Once it has been done, it can be an easily repeatable process, making the initial investment worthwhile. Thus, there remains a need for an effective authenticity verification system capable of preventing such workarounds.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing an authenticity verification system for dynamically authenticating an at least one physical or virtual object. In at least one embodiment, upon a user desiring to verify the authenticity of a given object via an at least one user device, a public identifier of a corresponding rewritable memory device attached to said object is obtained by said user device and transmitted to a central computing system. Upon determining that the public identifier is present in an at least one database maintained by the central computing system, select details related to said object, as stored in the at least one database, are transmitted to said user device. Additionally, a new public identifier is generated and transmitted to the corresponding rewritable memory device of said object so as to overwrite the previous public identifier stored thereon.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
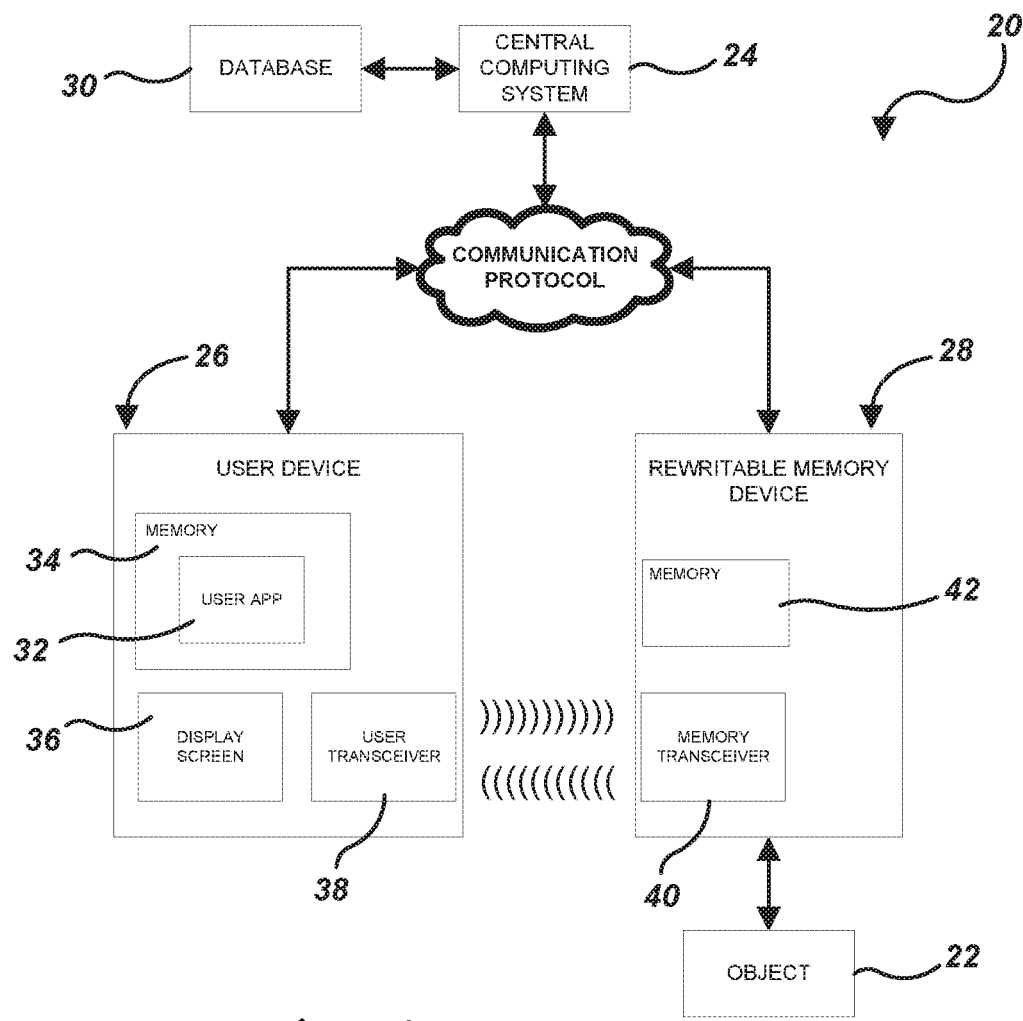
FIG. 1 is a simplified schematic view of an exemplary authenticity verification system, in accordance with at least one embodiment.

Turning now to FIG. 1, there is shown a simplified schematic view of an exemplary authenticity verification system 20 for dynamically authenticating an at least one physical or virtual object 22. In at least one embodiment, the system 20 provides a central computing system 24, an at least one user device 26 associated with an at least one user, and an at least one rewritable memory device 28 associated with the at least one object 22. As discussed further below, in at least one embodiment, the computing system 24 is in selective communication with the at least one user device 26, with the computing system 24 being configured for receiving and processing data related to the at least one object 22. Additionally, in at least one embodiment, an at least one database 30 is in communication with the computing system 24 and configured for selectively storing said data related to the at least one object 22. In at least one embodiment, the computing system 24 and database 30 are one and the same—as such, it is intended that those terms as used herein are to be interchangeable with one another. In at least one embodiment, the computing system 24 and database 30 are omitted, such that the system 20 and associated methods described herein are implemented solely through the at least one user device 26 and the at least one rewritable memory device 28—thus, any methods or functionality described herein as being carried out by the computing system 24 or database 30 may, in at least one embodiment, also be carried out by the at least one user device 26 and/or the at least one rewritable memory device 28, regardless of whether such embodiments nevertheless incorporate the computing system 24 and/or database 30.

At the outset, it should be noted that communication between each of the computing system 24, at least one user device 26, at least one rewritable memory device 28, and at least one database 30 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. Similarly, in at least one embodiment, communications between each of the computing system 24, at least one user device 26, at least one rewritable memory device 28, and at least one database 30 may be encrypted using any encryption method (or combination of methods) now known or later developed. It should also be noted that the term "user device" is intended to include any type of computing or electronic device now known or later developed—such as desktop computers, mobile phones, smartphones, laptop computers, tablet computers, personal data assistants, gaming devices, etc.—capable of substantially carrying out the functionality described herein. As such, the present invention should not be read as being limited to use with any one particular type of computing or electronic device, even though certain exemplary devices may be mentioned or shown herein for illustrative purposes. It should also be noted that, in at least one embodiment, the term "object" is intended to generally include any type of physical (living or non-living) or virtual object, now known or later developed.

With continued reference to FIG. 1, in the exemplary embodiment, each of the computing system 24, at least one user device 26, at least one rewritable memory device 28, and at least one database 30 contains the hardware and software necessary to carry out the exemplary methods for dynamically authenticating the at least one object 22, as described herein. Furthermore, in at least one embodiment, the computing system 24 comprises a plurality of computing devices selectively working in concert with one another to carry out the exemplary methods for dynamically authenticating the at least one object 22, as described herein. In at least one embodiment, the at least one user device 26 provides a user application 32 residing locally in memory 34 on the user device 26, the user application 32 being configured for selectively communicating with at least one of the computing system 24 and the at least one rewritable memory device 28, as discussed further below. Accordingly, then, in at least one embodiment, the at least one user device 26 is in the possession of a user who is desirous of verifying the authenticity of the at least one object 22. It should be noted that the term "memory," as it relates to the at least one user device 26, is intended to include any type of electronic storage medium (or combination of storage mediums) now known or later developed, such as local hard drives, RAM, flash memory, secure digital ("SD") cards, external storage devices, network or cloud storage devices, integrated circuits, etc. Additionally, the term "rewritable memory device" is intended to include any type of computing or electronic device, now known or later developed, containing a sufficient amount of rewritable memory—such as radio frequency identification ("RFID") tags, hard drives, RAM, flash memory, secure digital ("SD") cards, etc.—capable of substantially carrying out the functionality described herein. As such, the present invention should not be read as being limited to use with any one particular type of rewritable memory device 28, even though certain exemplary devices may be mentioned or shown herein for illustrative purposes.

In at least one embodiment, the various components of the at least one user device 26 may reside on a single computing and/or electronic device, or may separately reside on two or more computing and/or electronic devices in communication with one another. In at least one embodiment, the functionality provided by the user application 32 resides remotely in memory on the computing system 24 and/or database 30, with each user device 26 capable of accessing said functionality via an online portal hosted by the computing system 24 and/or database 30, either in addition to or in lieu of the user application 32 residing locally in memory 34 on the at least one user device 26. It should be noted that, for simplicity purposes, the functionality provided by the user application 32 will be described herein as such—even though certain embodiments may provide said functionality through an online portal. It should also be noted that, for simplicity purposes, when discussing functionality and the various methods that may be carried out by the system 20 herein, the terms "user device" and "user application" are intended to be interchangeable.

With continued reference to FIG. 1, in at least one embodiment, the at least one user device 26 provides an at least one display screen 36 for providing an at least one graphical user interface to assist the associated user in possession of said user device 26 to utilize the various functions provided by the system 20. Additionally, in at least one embodiment, the at least one user device 26 provides an at least one user transceiver 38 configured for selectively communicating with a corresponding memory transceiver 40 of the at least one rewritable memory device 28, thereby allowing the user device 26 to selectively read and write data to a memory 42 of the at least one rewritable memory device 28, as discussed further below. For example, where the at least one rewritable memory device 28 is an RFID tag, the user and memory transceivers 38 and 40 may utilize near-field communication ("NFC"), or alternatively may be a high frequency ("HF") RFID reader/writer. Ultimately, the particular types of user and memory transceivers 38 and 40 is dependent upon the type of rewritable memory device 28 being used by the system 20. As such, the present invention should not be read as being limited to use with any one particular type of user transceiver 38 and/or memory transceiver 40, even though certain exemplary types of transceivers may be mentioned or shown herein for illustrative purposes.

Figure 3:
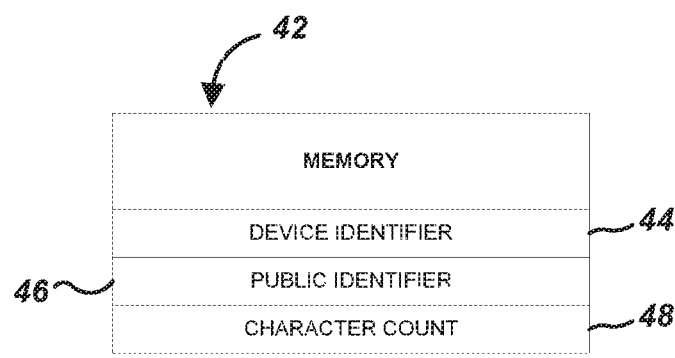
FIG. 3 is an architecture diagram of an exemplary memory data structure of an exemplary rewritable memory device, in accordance with at least one embodiment.
Figures 4, 5:
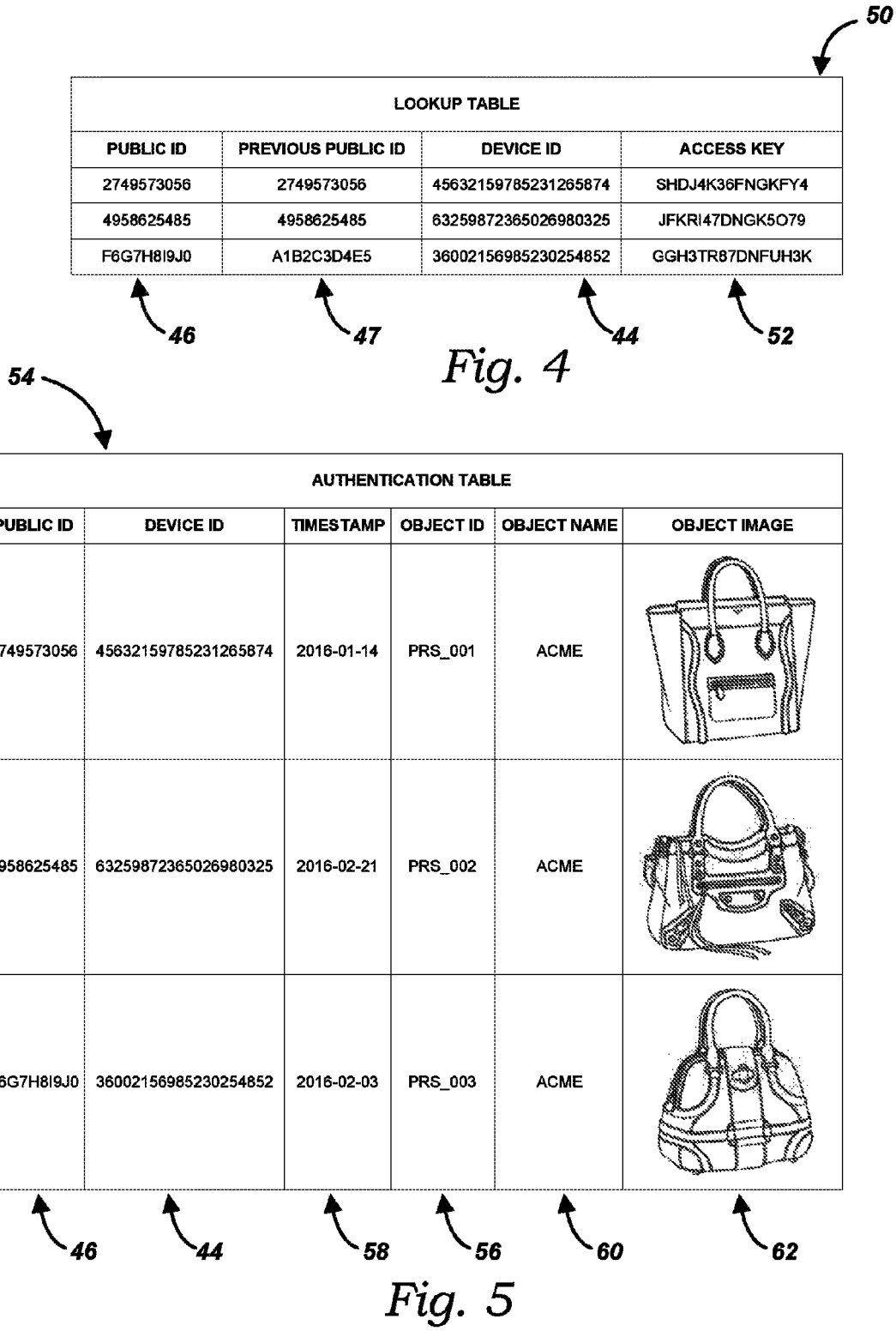
FIG. 4 is an architecture diagram of an exemplary lookup table, in accordance with at least one embodiment.
FIG. 5 is an architecture diagram of an exemplary authentication table, in accordance with at least one embodiment.

As illustrated in the architecture diagram of FIG. 3 and discussed in greater detail below, in at least one embodiment, the memory 42 of the at least one rewritable memory device 28 contains at least one of a unique device identifier 44, a unique public identifier 46 (such as a string of alphanumeric characters, for example) and a character count 48 representing the number of characters successfully written into the current public identifier 46 value, as discussed in detail below. Additionally, in at least one embodiment, as illustrated in FIG. 4, the at least one database 30—or, alternatively, the computing system 24—provides an at least one lookup table 50 containing details related to the at least one rewritable memory device 28, including at least one of the public identifier 46 currently associated with each of the at least one rewritable memory device 28, an at least one previous public identifier 47 associated with each of the at least one rewritable memory device 28 (i.e., the public identifier that was associated with each of the at least one rewritable memory device 28 immediately prior to said current public identifier 46), and a unique access key 52 associated with each of the at least one rewritable memory device 28, as discussed further below. In at least one embodiment, as illustrated in FIG. 5, the at least one database 30—or, alternatively, the computing system 24—further provides an at least one authentication table 54 containing details related to the at least one object 22, including at least one of the public identifier 46 and device identifier 48 associated with the corresponding rewritable memory device 28, a timestamp 58 containing a date and/or time at which the public identifier 46 was saved to the rewritable memory device 28, a unique object identifier 56 (such as a serial number, for example), an object name 60 (such as a brand name and/or model name, for example), and an object image 62 (such as a product photo, for example). It should be noted that, in at least one embodiment, the lookup table 50 and the authentication table 54 are a single table. It should also be noted that while the term "table" is used herein to describe certain exemplary data structures, in at least one embodiment, any other suitable data type or data structure, or combinations thereof, now known or later developed, capable of storing the appropriate data, may be substituted. Thus, the present invention should not be read as being so limited.

Figure 2:
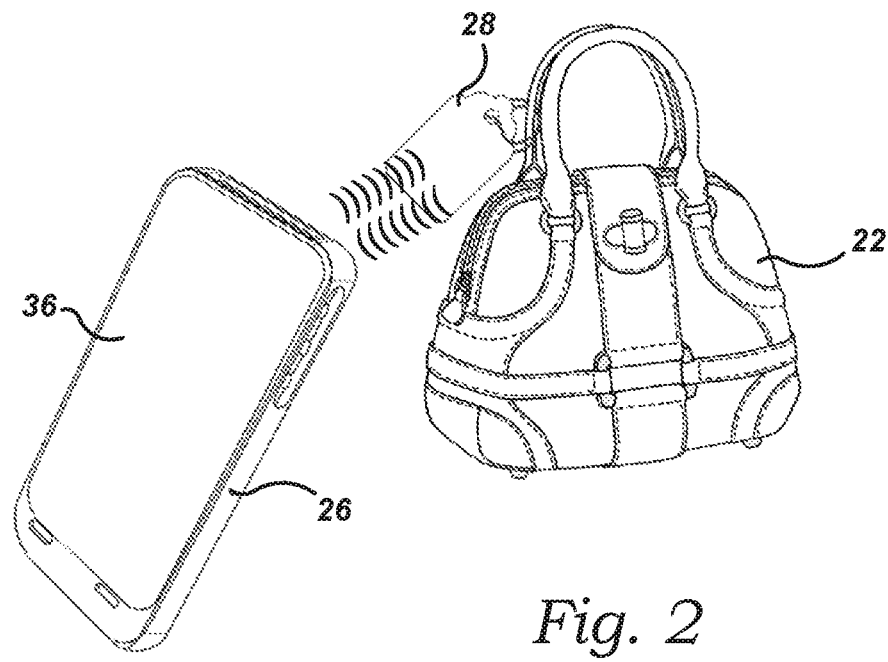
FIG. 2 is a diagram of an exemplary object and an associated rewritable memory device attached thereto, along with an exemplary user device, in accordance with at least one embodiment.

As discussed in detail below, the system 20 may be utilized in a variety of contexts, where it is desirable to allow the at least one user to verify the authenticity of the at least one object 22. In each such context, as illustrated in FIG. 2, the at least one rewritable memory device 28 is attached to or otherwise associated with a one of the at least one object 22. In other words, in at least one embodiment, the system 20 utilizes a one-to-one relationship between rewritable memory devices 28 and objects 22 (i.e., a separate rewritable memory device 28 for each object 22). Thus, in at least one embodiment, where the at least one object 22 is a physical/tangible item, the corresponding at least one rewritable memory device 28 is physically attached or otherwise affixed to said object 22 in any form or method now known or later developed. For example, where a given object 22 is a retail item, such as a handbag, the corresponding rewritable memory device 28 may be incorporated into a hang tag, or even the associated retailer's price tag. In at least one further example, the rewritable memory device 28 may be physically embedded within the corresponding object 22. In at least one embodiment, where the at least one object 22 is a virtual item (i.e., a non-physical digital or electronic item), the corresponding at least one rewritable memory device 28 may be virtual as well, through software implementation. For simplicity purposes, the term "attach" (or "attached") is used herein to describe these various physical and virtual connections between the rewritable memory device 28 and the corresponding object 22. Typically, a given rewritable memory device 28 is attached to the corresponding object 22 by the manufacturer of said object 22; however, in some cases, other individuals or entities—such as vendors, distributors, sales personnel, retail management, wholesale management or even consumers—may attach the rewritable memory device 28 (especially since any or all of these individuals or entities can benefit from using the system 20).

It should be noted that the below described applications of the system 20 are merely exemplary and are being provided herein for illustrative purposes. As such, the system 20 and associated methods described herein should not be read as being so limited, but instead can be utilized in any context, now known or later conceived, where there is a need for verifying the authenticity of the at least one object 22.

Figure 6:
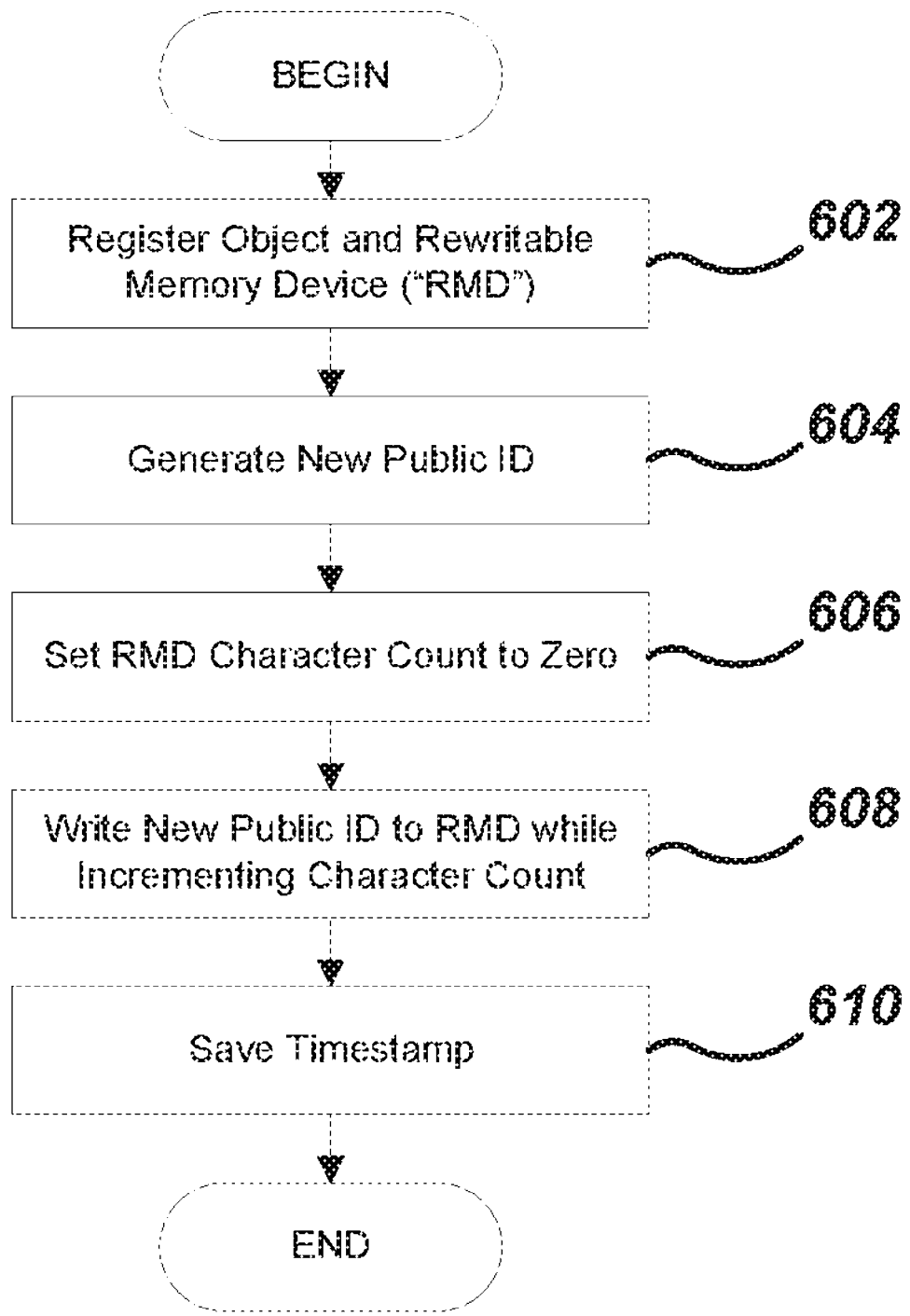
FIGS. 6 and 7 are flow diagrams of exemplary methods for dynamically authenticating an at least one object, in accordance with at least one embodiment.

In at least one embodiment, as illustrated in the flow diagram of FIG. 6, upon a new object 22 being registered with the system 20 (i.e., to allow the at least one user to subsequently verify the authenticity of the object 22), the computing system 24 first creates an entry in the lookup table 50 for the associated rewritable memory device 28 (602), including at least one of the public identifier 46, previous public identifier 47, and device identifier 44 of the rewritable memory device 28, and a randomly generated access key 52 used to restrict write access to the rewritable memory device 28, as discussed further below. The new public identifier 46 (to be associated with the rewritable memory device 28 and, in turn, the corresponding object 22) is generated and saved in a corresponding entry of the lookup table 50 and authentication table 54 (604), along with any other desired information related to the corresponding object 22, as mentioned above. The public identifier 46 is then transmitted to and saved on the rewritable memory device 28. In at least one embodiment, in order to prevent data corruption, the rewritable memory device 28 maintains the character count 48 value which represents the number of characters successfully written into the public identifier 46 value on the rewritable memory device 28. Accordingly, in at least one such embodiment, prior to transmitting the public identifier 46 value, the character count 48 is first set to zero (606). As each character is subsequently written into the public identifier 46 value, the character count 48 value is increased by one (608). In at least one such embodiment, and as discussed further below, where less than the entire public identifier 46 value is transmitted to the rewritable memory device in a given data packet, tracking the number of characters successfully written helps ensure that an incomplete public identifier 46 (where, for example, one or more characters of the public identifier 46 value do not reach the rewritable memory device, such as due to a loss of communication or a failure of the communication protocol) will nevertheless be recognized by the computing system 24. For example, if the public identifier 46 value has a length of 10 characters, a character count 48 value of anything other than "10" would indicate that less than the entire the public identifier 46 value was written to the rewritable memory device 28. The purpose of the character count 48 is discussed further below. It should be noted that, in at least one further embodiment, any other method for preventing data corruption, now known or later developed, may be substituted. In at least one embodiment, upon transmitting the public identifier 46 to the rewritable memory device 28, the computing system 24 stores a corresponding timestamp 58 in the authentication table 54 (610). In at least one embodiment, the rewritable memory device 28 and its associated object 22 are then made available/accessible to the at least one user (such as a consumer, for example).

Figure 7:
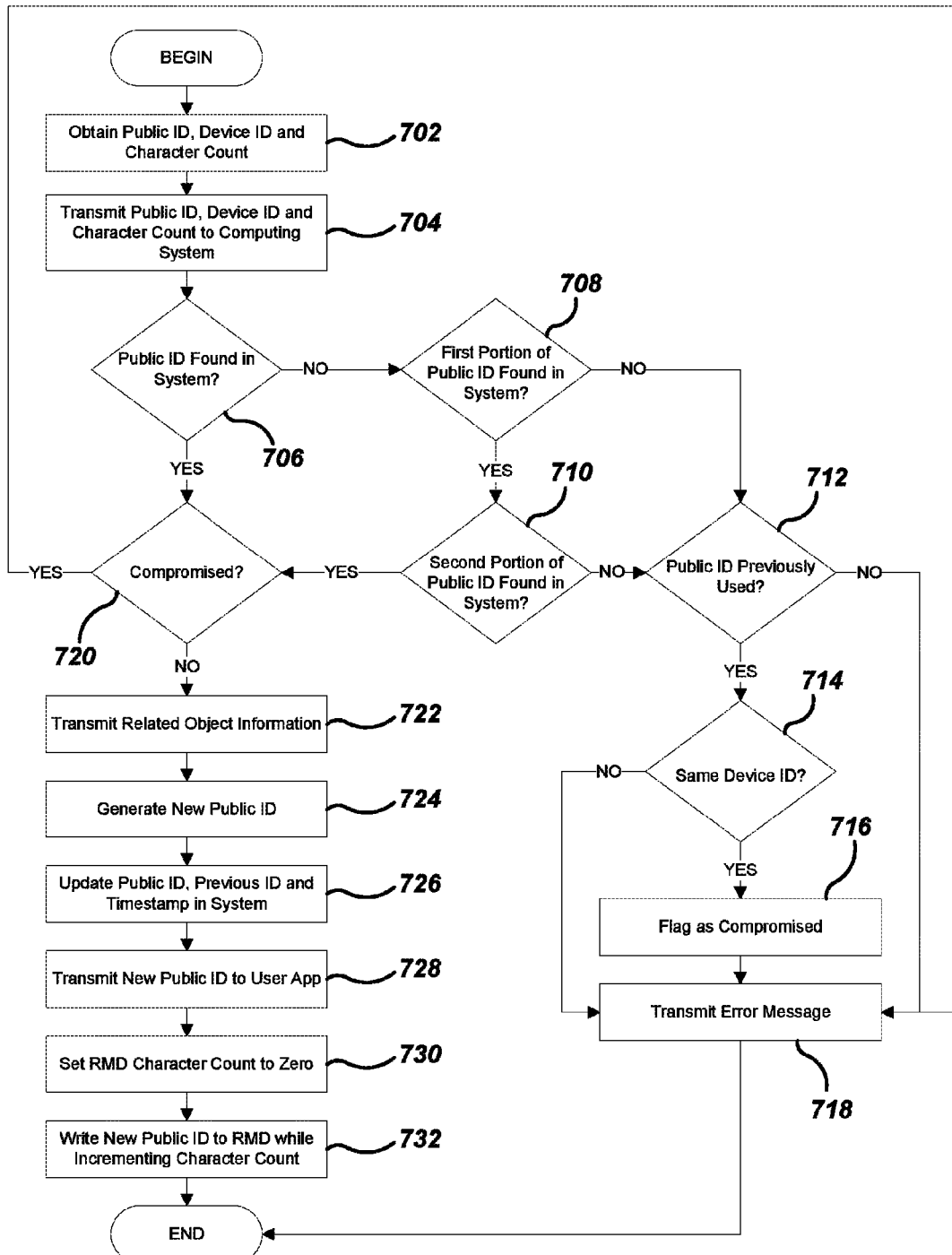

As illustrated in the flow diagram of FIG. 7, in at least one embodiment, through the user application 32 residing either locally in memory 34 on the at least one user device 26 or remotely on the computing system 24 and/or database 30, upon an associated user of the at least one user device 26 desiring to verify the authenticity of a given object 22, the user application 32 obtains the public identifier 46 and device identifier 44 of the corresponding rewritable memory device 28 along with the character count 48 (702). In at least one embodiment, where the given object 22 is a physical item, the user device 26 is placed in sufficient proximity to the rewritable memory device 28 so that the user transceiver 38 is capable of communicating with the memory transceiver 40; though, even with physical items, the need for the user device 26 to be placed in sufficient proximity to the rewritable memory device 28 is dependent upon the particular communication protocol being utilized (i.e., proximity is not required in every such embodiment). Once the user application 32 has obtained the public identifier 46, device identifier 44 and character count 48, the user application 32 transmits the public identifier 46, device identifier 44 and character count 48 to the computing system 24 by way of an authentication request (704). The computing system 24 accesses the lookup table 50 based on the transmitted public identifier 46. If the public identifier 46 is not found in the lookup table 50 (706), the computing system 24 attempts to access the lookup table 50 again (708), but this time based only on a portion of the public identifier 46, wherein said portion contains the first X successive characters of the public identifier 46 value, where X equals the character count 48 value. In at least one further embodiment, rather than first trying to search the lookup table 50 for the entire public identifier 46, the computing system 24 instead first determines whether the transmitted public identifier 46 even contains a complete public identifier 46 value, which it is able to determine based on the transmitted character count 48—i.e., if the transmitted character count 48 value is not equal to the size/length of the transmitted public identifier 46, then the transmitted public identifier 46 is incomplete. Upon determining that the transmitted public identifier 46 is complete (based on the transmitted character count 48), the computing system 24 accesses the lookup table 50 based on the entire transmitted public identifier 46. Otherwise, upon determining that the transmitted public identifier 46 is incomplete (again, based on the transmitted character count 48), the computing system 24 accesses the lookup table 50 based on said portion of the transmitted public identifier 46.

In a bit more detail, in at least one embodiment, where less than all of the characters of the public identifier 46 were written to the rewritable memory device 28, the public identifier 46 stored on the rewritable memory device 28 would consist of a portion of the current public identifier 46 followed by a portion of the previous public identifier 47. For example, if the public identifier 46 value on the rewritable memory device 28 is "A1B2C3D4E5" (i.e., consisting of 10 characters total) and the public identifier 46 is to be overwritten with a new value of "F6G7H8I9J0" (the purpose for which is discussed further below), but the computing system 24 subsequently determines that the character count 48 is only "5" (i.e., only the first 5 characters of the new public identifier 46 value were successfully written to the rewritable memory device 28, leaving the remaining 5 characters of the previous public identifier 47 intact), this means that a first portion (i.e., the first 5 characters, in this example) of the public identifier 46 value on the rewritable memory device 28 is "F6G7H" while a second portion (i.e., the remaining characters) of the public identifier 46 would consist of the previous public identifier 47 characters "3D4E5," thus making the public identifier 46 value "F6G7H3D4E5."

With this in mind, referring again to FIG. 7, in at least one such embodiment, the computing system 24 attempts to access the lookup table 50 based on a first portion of the transmitted public identifier 46, where said first portion consists of the first X successive characters of the transmitted public identifier 46—again, where X equals the character count 48 value. If the first portion of the transmitted public identifier 46 is not found in the lookup table 50 (708), the computing system 24 transmits an error message to the user application 32 (712)—indicating that the public identifier 46 does not exist in the system 20—which is then presented to the user via the display screen 36 of the user device 26 (or via audible cues, tactile cues, or any other form of feedback, now known or later developed in at least one further embodiment).

Otherwise, if the first portion of the transmitted public identifier 46 is found in the lookup table 50 (708), the computing system 24 next compares a second portion of the transmitted public identifier 46 against a corresponding second portion of the associated previous public identifier 47 in the lookup table 50 (710), where said second portion consists of the remaining characters of the transmitted public identifier 46. If the second portion of the transmitted public identifier 46 does not match the corresponding second portion of the associated previous public identifier 47 in the lookup table 50, the computing system 24 transmits an error message to the user application 32 (718)—indicating that the public identifier 46 does not exist in the system 20—which is then presented to the user via the display screen 36 of the user device 26 (or via audible cues, tactile cues, or any other form of feedback, now known or later developed in at least one further embodiment).

In at least one embodiment, if the computing system 24 determines that the transmitted public identifier 46 does not exist in the at least one database 30, it performs a search of all previous public identifier 47 values in the at least one database 30 to determine whether the transmitted public identifier 46 may have previously been used by another rewritable memory device 28 (712)—specifically, by an unauthorized clone of the rewritable memory device 28. For example, if an unauthorized clone of a given rewritable memory device 28 is produced by a counterfeiter—such as in a scenario where a counterfeit version of the corresponding object 22 has been produced, along with a counterfeit version of the rewritable memory device 28—then the counterfeiter scans the cloned rewritable memory device 28 first so that the computing system 24 issues a new public identifier 46 for it, the original rewritable memory device 28 would be rendered invalid (because the original rewritable memory device 28 now has an outdated public identifier 46 that is no longer reflected as being a current public identifier 46 in the at least one database 30), while the cloned rewritable memory device 28 (and, in turn, the corresponding counterfeit object 22) would be viewed by the computing system 24 as valid/authentic. To better prevent against this scenario, in at least one embodiment, upon discovering one or more previous public identifier 47 values in the at least one database 30 matching the transmitted public identifier 46 (712), the computing system 24 next determines whether the corresponding device identifier 44 of said at least one previous public identifier 47 matches the transmitted device identifier 44 (714). Upon determining that the device identifier 44 of said at least one previous public identifier 47 matches the transmitted device identifier 44, the computing system 24 concludes that the associated rewritable memory device 28 has been cloned and flags the corresponding public identifiers 46 in the at least one database as "compromised" or "invalid" (716), so that the at least one user will be notified of the counterfeit status should any of the cloned rewritable memory devices 28 be scanned in the future.

If the public identifier 46 is found in the lookup table 50—again, either the entire public identifier 46 (706) or, alternatively (in at least one embodiment), the respective first and second portions of the public identifier 46 (708, 710), as discussed above—the computing system 24 determines whether the transmitted public identifier 46 or device identifier 44 have been flagged as being compromised in the at least one database 30 (720) and, if so, transmits an appropriate notification to the user application 32 (718). In at least one embodiment, the computing system 24 also determines whether the transmitted device identifier 44 matches the device identifier 46 associated with the corresponding public identifier 46 found in the lookup table 50. If the transmitted device identifier 44 does not match said device identifier 46 in the lookup table 50, the computing system 24 transmits an error message to the user application 32—indicating that the public identifier 46 does not exist in the system 20 for the particular rewritable memory device 48 associated with the transmitted device identifier 44—which is then presented to the user via the display screen 36 of the user device 26 (or via audible cues, tactile cues, or any other form of feedback, now known or later developed in at least one further embodiment).

If neither the public identifier 46 nor device identifier 44 have been flagged as being compromised, the computing system 24 accesses the corresponding data in the authentication table 54 and transmits the desired information associated with the corresponding object 22 to the user application 32 (722), such as the object name 60 and object image 62, which may then be displayed on the display screen 36 of the user device 26. Accordingly, the user is able to visually compare the displayed information against the object 22 to which the rewritable memory device 28 is attached—and if the information corresponds to the object 22, then the authenticity of the object 22 has been verified.

In at least one embodiment, the computing system 24 also generates a new public identifier 46 (724), updates the corresponding public identifier 46 and previous identifier 47 values, along with the timestamp 58, in the lookup table 50 and authentication table 54 (726), and transmits the new public identifier 46 to the user application 32 (728). The user application 32 then sets the character count 48 to zero (730) and begins transmitting the new public identifier 46 to the rewritable memory device 28 (732), thereby overwriting the previously saved public identifier 46 thereon. Again, as each character is subsequently written into the public identifier 46 value, the character count 48 value is increased by one. In this way, in at least one such embodiment, the "one time only use" of a given public identifier 46 better ensures that a given public identifier 46 will, in most cases, not be used twice by the system 20. Preferably, in at least one embodiment, the system 20 is a closed system which allows the uniqueness of the public identifiers 46 and functionality to be guaranteed. In at least one embodiment, the computing system also transmits the associated access key 52 to the user application 32, to temporarily grant the user application 32 write access to the rewritable memory device 28. In at least one embodiment, where the given object 22 is a physical item, the user device 26 is placed in sufficient proximity to the rewritable memory device 28 so that the user transceiver 38 is capable of transmitting the new public identifier 46 and corresponding character count 48 to the memory transceiver 40; though, again, even with physical items, the need for the user device 26 to be placed in sufficient proximity to the rewritable memory device 28 is dependent upon the particular communication protocol being utilized (i.e., proximity is not required in every such embodiment).

In at least one embodiment, if the user application 32 is unable to transmit the new public identifier 46 to the rewritable memory device 28—for example, if the associated user device 26 is no longer in sufficient proximity to the rewritable memory device 28—the public identifier 46, while left unchanged on the rewritable memory device 28, will nevertheless be locatable in the lookup table 50 and the authentication table 54 the next time a user desires to verify the authenticity of the associated object 22, given that the public identifier 46 on the rewritable memory device will match the previous public identifier 47 in the lookup table 50. And if the user application 32 is only able to transmit a portion of the new public identifier 46 to the rewritable memory device 28, the combination of the new public identifier 46 and previous public identifier 47 will also nevertheless be locatable in the lookup table 50 the next time a user desires to verify the authenticity of the associated object 22, as discussed in detail above.

Thus, in at least one embodiment, the system 20 is tamperproof in that if any tampering occurs, electronically or physically, the system 20 is rendered un-usable. Even if a rewritable memory device 28 is cloned (or otherwise counterfeited/copied), the cloned rewritable memory device 28 can only be used until any such cloned rewritable memory device 28 is scanned by the user application 32, which will overwrite a new public identifier 46 received from the computing system 24 onto the rewritable memory device 28, thereby leaving any other of the cloned rewritable memory devices 28 with an incorrect (outdated) public identifier 46. One advantage, then, is that hacking and cloning of one rewritable memory device 28 cannot be scaled to a mass production of counterfeit rewritable memory devices 28, since the rewritable memory devices 28 have a one-to-one relationship with the corresponding objects 22; thereby rendering the counterfeiting process extremely expensive and impractical. Accordingly, in at least one embodiment, the system 20 provides a secure, easy to use and implement, and cost effective solution to the problem of determining whether a physical or virtual item or product is genuine.

Aspects of the present specification may also be described as follows:

1. A method for dynamically authenticating an at least one object, the method comprising the steps of: implementing a central computing system configured for receiving and processing data related to the at least one object; implementing an at least one rewritable memory device attached to each of the at least one object, the at least one rewritable memory device configured for storing at least a unique public identifier, a unique device identifier, and a character count representing the number of characters of the public identifier successfully transmitted to the rewritable memory device; maintaining the public identifier, an at least one previous public identifier, and the device identifier of each of the at least one rewritable memory device, and select details related to the corresponding at least one object, in an at least one database in communication with the computing system; implementing a user application residing in memory on an at least one user device under the control of an at least one user, the at least one user device in selective communication with each of the computing system and the at least one rewritable memory device; and upon a one of the at least one user desiring to verify the authenticity of a one of the at least one object via the corresponding user device: obtaining, via said user device, the public identifier, device identifier, and character count of the corresponding rewritable memory device of said object; transmitting the public identifier, device identifier, and character count to the computing system; upon determining that the transmitted public identifier is complete: upon determining that the transmitted public identifier matches any of the at least one public identifier stored in the at least one database, authenticating the transmitted public identifier; upon determining that the transmitted public identifier does not match any of the at least one public identifier stored in the at least one database, invalidating the transmitted public identifier; upon determining that the transmitted public identifier is incomplete: identifying a first portion of the transmitted public identifier, said first portion consisting of an initial X successive characters contained in the transmitted public identifier, where X equals the character count; upon determining that the first portion of the transmitted public identifier matches a corresponding first portion of at least one of the at least one public identifier stored in the at least one database: identifying a second portion of the transmitted public identifier, said second portion consisting of any remaining characters of the transmitted public identifier; comparing the second portion of the transmitted public identifier with the corresponding second portion of each previous public identifier associated with said at least one matched public identifier stored in the at least one database; upon determining that the second portion of the transmitted public identifier matches a corresponding second portion of said at least one previous public identifier, authenticating the transmitted public identifier; and upon determining that the second portion of the transmitted public identifier does not match a corresponding second portion of any of said at least one previous public identifier, invalidating the transmitted public identifier; and upon determining that the first portion of the transmitted public identifier does not match a corresponding first portion of any of the at least one public identifier stored in the at least one database, invalidating the transmitted public identifier; upon authenticating the transmitted public identifier: transmitting select details related to said object, as stored in the at least one database, to said user device; generating a new public identifier; updating the public identifier and previous public identifier in the at least one database; transmitting the new public identifier to said user device; setting the character count of the corresponding rewritable memory device of said object to zero via said user device; transmitting the new public identifier, via said user device, to said rewritable memory device; and sequentially incrementing said character count, via said user device, as each character of said new public identifier is successfully written to said rewritable memory device; and upon invaliding the transmitted public identifier, transmitting an error message to said user device.

2. The method according to embodiment 1, wherein the step of determining that the transmitted public identifier is complete further comprises the steps of: comparing the transmitted character count with a length of the transmitted public identifier; and upon determining that the transmitted character count is equal to the length of the transmitted public identifier, concluding that the transmitted public identifier is complete.

3. The method according to embodiments 1-2, wherein the step of determining that the transmitted public identifier is incomplete further comprises the step of: comparing the transmitted character count with a length of the transmitted public identifier; and upon determining that the transmitted character count is not equal to the length of the transmitted public identifier, concluding that the transmitted public identifier is incomplete.

4. The method according to embodiments 1-3, wherein the step of determining that the transmitted public identifier matches any of the at least one public identifier stored in the at least one database, further comprises the steps of: comparing the transmitted device identifier with the device identifier associated with said at least one matched public identifier stored in the at least one database; upon determining that the transmitted device identifier matches the device identifier associated with said at least one matched public identifier, authenticating the transmitted public identifier; and upon determining that the transmitted device identifier does not match the device identifier associated with any of said at least one matched public identifier, invalidating the transmitted public identifier.

5. The method according to embodiments 1-4, wherein the step of upon determining that the second portion of the transmitted public identifier matches a corresponding second portion of said at least one previous public identifier, further comprises the steps of: comparing the transmitted device identifier with the device identifier associated with said at least one previous public identifier; upon determining that the transmitted device identifier matches the device identifier associated with said at least one previous public identifier, authenticating the transmitted public identifier; and upon determining that the transmitted device identifier does not match the device identifier associated with any of said at least one previous public identifier, invalidating the transmitted public identifier.

6. The method according to embodiments 1-5, further comprising the steps of, upon invaliding the transmitted public identifier: upon determining that the transmitted public identifier matches any of the at least one previous public identifier stored in the at least one database: comparing the transmitted device identifier with the device identifier associated with said at least one matched previous public identifier stored in the at least one database; and upon determining that the transmitted device identifier matches the device identifier associated with said at least one matched previous public identifier, flagging the public identifier and device identifier as compromised.

7. The method according to embodiments 1-6, further comprising the steps of, upon authenticating the transmitted public identifier: upon determining that the transmitted public identifier has been flagged as compromised, transmitting an error message to said user device.

8. The method according to embodiment 1-7, wherein the step of obtaining the public identifier and character count of the corresponding rewritable memory device of said object, further comprises the step of placing the user device in sufficient proximity to the rewritable memory device so that a user transceiver of the user device is capable of communicating with a memory transceiver of the rewritable memory device.

9. The method according to embodiments 1-8, wherein the step of transmitting the new public identifier to the corresponding rewritable memory device of said object further comprises the step of placing the user device in sufficient proximity to the rewritable memory device so that the user transceiver of the user device is capable of communicating with the memory transceiver of the rewritable memory device.

10. The method according to embodiments 1-9, wherein the step of transmitting an error message to said user device further comprises the step of presenting the error message to said user via at least one of a visual, audible or tactile cue via said user device.

11. The method according to embodiments 1-10, wherein the step of transmitting select details related to said object to said user device further comprises the step of transmitting at least one of an object name and an object image.

12. The method according to embodiments 1-11, further comprising the step of presenting the select details related to said object via a display screen of said user device.

13. The method according to embodiments 1-12, further comprising the step of generating a unique access key associated with a given one of the at least one rewritable memory device, thereby restricting write access to said rewritable memory device.

14. The method according to embodiments 1-13, further comprising the step of generating a timestamp associated with each of the at least one public identifier stored in the at least one database, said timestamp containing at least one of a date and time at which said public identifier was generated.

15. A method for dynamically authenticating an at least one object, the method comprising the steps of: implementing a central computing system configured for receiving and processing data related to the at least one object; implementing an at least one rewritable memory device attached to each of the at least one object, the at least one rewritable memory device configured for storing at least a unique public identifier, a unique device identifier, and a character count representing the number of characters of the public identifier successfully transmitted to the rewritable memory device; maintaining the public identifier, an at least one previous public identifier, and the device identifier of each of the at least one rewritable memory device, and select details related to the corresponding at least one object, in an at least one database in communication with the computing system; implementing a user application residing in memory on an at least one user device under the control of an at least one user, the at least one user device in selective communication with each of the computing system and the at least one rewritable memory device; and upon a one of the at least one user desiring to verify the authenticity of a one of the at least one object via the corresponding user device: obtaining, via said user device, the public identifier, device identifier, and character count of the corresponding rewritable memory device of said object; transmitting the public identifier, device identifier, and character count to the computing system; upon determining that the transmitted public identifier matches any of the at least one public identifier stored in the at least one database, authenticating the transmitted public identifier; upon determining that the transmitted public identifier does not match any of the at least one public identifier stored in the at least one database: identifying a first portion of the transmitted public identifier, said first portion consisting of an initial X successive characters contained in the transmitted public identifier, where X equals the character count; upon determining that the first portion of the transmitted public identifier matches a corresponding first portion of at least one of the at least one public identifier stored in the at least one database: identifying a second portion of the transmitted public identifier, said second portion consisting of any remaining characters of the transmitted public identifier; comparing the second portion of the transmitted public identifier with the corresponding second portion of each previous public identifier associated with said at least one matched public identifier stored in the at least one database; upon determining that the second portion of the transmitted public identifier matches a corresponding second portion of said at least one previous public identifier, authenticating the transmitted public identifier; and upon determining that the second portion of the transmitted public identifier does not match a corresponding second portion of any of said at least one previous public identifier, invalidating the transmitted public identifier; and upon determining that the first portion of the transmitted public identifier does not match a corresponding first portion of any of the at least one public identifier stored in the at least one database, invalidating the transmitted public identifier; upon authenticating the transmitted public identifier: upon determining that the transmitted public identifier has been flagged as compromised, transmitting an error message to said user device; and upon determining that the transmitted public identifier has not been flagged as compromised: transmitting select details related to said object, as stored in the at least one database, to said user device; generating a new public identifier; updating the public identifier and previous public identifier in the at least one database; transmitting the new public identifier to said user device; setting the character count of the corresponding rewritable memory device of said object to zero via said user device; transmitting the new public identifier, via said user device, to said rewritable memory device; and sequentially incrementing said character count, via said user device, as each character of said new public identifier is successfully written to said rewritable memory device; and upon invaliding the transmitted public identifier: upon determining that the transmitted public identifier matches any of the at least one previous public identifier stored in the at least one database: comparing the transmitted device identifier with the device identifier associated with said at least one matched previous public identifier stored in the at least one database; and upon determining that the transmitted device identifier matches the device identifier associated with said at least one matched previous public identifier, flagging the public identifier and device identifier as compromised; and transmitting an error message to said user device.

16. An authenticity verification system for dynamically authenticating an at least one object, the system comprising: a central computing system configured for receiving and processing data related to the at least one object; an at least one rewritable memory device attached to each of the at least one object, the at least one rewritable memory device configured for storing at least a unique public identifier, a unique device identifier, and a character count representing the number of characters of the public identifier successfully transmitted to the rewritable memory device; an at least one database in communication with the computing system and configured for storing the public identifier, an at least one previous public identifier, and the device identifier of each of the at least one rewritable memory device, and select details related to the corresponding at least one object; an at least one user device under the control of an at least one user and in selective communication with each of the computing system and the at least one rewritable memory device, the at least one user device providing a user application residing in memory thereon; and wherein, upon a one of the at least one user desiring to verify the authenticity of a one of the at least one object via the corresponding user device, the system is configured for: obtaining, via said user device, the public identifier, device identifier, and character count of the corresponding rewritable memory device of said object; transmitting the public identifier, device identifier, and character count to the computing system; upon determining that the transmitted public identifier is complete: upon determining that the transmitted public identifier matches any of the at least one public identifier stored in the at least one database, authenticating the transmitted public identifier; upon determining that the transmitted public identifier does not match any of the at least one public identifier stored in the at least one database, invalidating the transmitted public identifier; upon determining that the transmitted public identifier is incomplete: identifying a first portion of the transmitted public identifier, said first portion consisting of an initial X successive characters contained in the transmitted public identifier, where X equals the character count; upon determining that the first portion of the transmitted public identifier matches a corresponding first portion of at least one of the at least one public identifier stored in the at least one database: identifying a second portion of the transmitted public identifier, said second portion consisting of any remaining characters of the transmitted public identifier; comparing the second portion of the transmitted public identifier with the corresponding second portion of each previous public identifier associated with said at least one matched public identifier stored in the at least one database; upon determining that the second portion of the transmitted public identifier matches a corresponding second portion of said at least one previous public identifier, authenticating the transmitted public identifier; and upon determining that the second portion of the transmitted public identifier does not match a corresponding second portion of any of said at least one previous public identifier, invalidating the transmitted public identifier; and upon determining that the first portion of the transmitted public identifier does not match a corresponding first portion of any of the at least one public identifier stored in the at least one database, invalidating the transmitted public identifier; upon authenticating the transmitted public identifier: transmitting at least one of an object name and an object image related to said object, as stored in the at least one database, to said user device; generating a new public identifier; updating the public identifier and previous public identifier in the at least one database; transmitting the new public identifier to said user device; setting the character count of the corresponding rewritable memory device of said object to zero via said user device; transmitting the new public identifier, via said user device, to said rewritable memory device; and sequentially incrementing said character count, via said user device, as each character of said new public identifier is successfully written to said rewritable memory device; and upon invaliding the transmitted public identifier, transmitting an error message to said user device.

17. The authenticity verification system according to embodiment 16, wherein the at least one rewritable memory device is an RFID tag.

18. The authenticity verification system according to embodiments 16-17, wherein the at least one user device provides an at least one user transceiver configured for selectively communicating with a corresponding memory transceiver of the at least one rewritable memory device.

19. The authenticity verification system according to embodiments 16-18, wherein each of the user transceiver and memory transceiver utilize a near-field communication protocol.

20. The authenticity verification system according to embodiments 16-19, wherein while determining that the transmitted public identifier is complete, the system is further configured for: comparing the transmitted character count with a length of the transmitted public identifier; and upon determining that the transmitted character count is equal to the length of the transmitted public identifier, concluding that the transmitted public identifier is complete.

21. The authenticity verification system according to embodiments 16-20, wherein while determining that the transmitted public identifier is incomplete, the system is further configured for: comparing the transmitted character count with a length of the transmitted public identifier; and upon determining that the transmitted character count is not equal to the length of the transmitted public identifier, concluding that the transmitted public identifier is incomplete.

22. The authenticity verification system according to embodiments 16-21, wherein while determining that the transmitted public identifier matches any of the at least one public identifier stored in the at least one database, the system is further configured for: comparing the transmitted device identifier with the device identifier associated with said at least one matched public identifier stored in the at least one database; upon determining that the transmitted device identifier matches the device identifier associated with said at least one matched public identifier, authenticating the transmitted public identifier; and upon determining that the transmitted device identifier does not match the device identifier associated with any of said at least one matched public identifier, invalidating the transmitted public identifier.

23. The authenticity verification system according to embodiments 16-22, wherein while determining that the second portion of the transmitted public identifier matches a corresponding second portion of said at least one previous public identifier, the system is further configured for: comparing the transmitted device identifier with the device identifier associated with said at least one previous public identifier; upon determining that the transmitted device identifier matches the device identifier associated with said at least one previous public identifier, authenticating the transmitted public identifier; and upon determining that the transmitted device identifier does not match the device identifier associated with any of said at least one previous public identifier, invalidating the transmitted public identifier.

24. The authenticity verification system according to embodiments 16-23, wherein upon invaliding the transmitted public identifier, the system is further configured for:

upon determining that the transmitted public identifier matches any of the at least one previous public identifier stored in the at least one database: comparing the transmitted device identifier with the device identifier associated with said at least one matched previous public identifier stored in the at least one database; and upon determining that the transmitted device identifier matches the device identifier associated with said at least one matched previous public identifier, flagging the public identifier and device identifier as compromised.

25. The authenticity verification system according to embodiments 16-24, wherein upon authenticating the transmitted public identifier, the system is further configured for: upon determining that the transmitted public identifier has been flagged as compromised, transmitting an error message to said user device.

26. The authenticity verification system according to embodiments 16-25, wherein the while transmitting an error message to said user device, the system is further configured for presenting the error message to said user via at least one of a visual, audible or tactile cue via said user device.

27. The authenticity verification system according to embodiments 16-26, wherein while transmitting select details related to said object to said user device, the system is further configured for transmitting at least one of an object name and an object image.

28. The authenticity verification system according to embodiments 16-27, wherein the system is further configured for presenting the select details related to said object via a display screen of said user device.

29. The authenticity verification system according to embodiments 16-28, wherein the system is further configured for generating a unique access key associated with a given one of the at least one rewritable memory device, thereby restricting write access to said rewritable memory device.

30. The authenticity verification system according to embodiments 16-29, wherein the system is further configured for generating a timestamp associated with each of the at least one public identifier stored in the at least one database, said timestamp containing at least one of a date and time at which said public identifier was generated.

In closing, regarding the exemplary embodiments of the present invention as shown and described herein, it will be appreciated that an authenticity verification system and associated methods of use are disclosed and configured for dynamically authenticating a given physical or virtual object via a rewritable memory device attached to said object. Because the principles of the invention may be practiced in a number of configurations beyond those shown and described, it is to be understood that the invention is not in any way limited by the exemplary embodiments, but is generally directed to an authenticity verification system and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for dynamically authenticating an at least one object, the method comprising the steps of:
   implementing a central computing system configured for receiving and processing data related to the at least one object;
   implementing an at least one rewritable memory device attached to each of the at least one object, the at least one rewritable memory device configured for storing at least a unique public identifier, a unique device identifier, and a character count representing the number of characters of the public identifier successfully transmitted to the rewritable memory device;

maintaining the public identifier, an at least one previous public identifier, and the device identifier of each of the at least one rewritable memory device, and select details related to the corresponding at least one object, in an at least one database in communication with the computing system;

implementing a user application residing in memory on an at least one user device under the control of an at least one user, the at least one user device in selective communication with each of the computing system and the at least one rewritable memory device; and upon a one of the at least one user desiring to verify the authenticity of a one of the at least one object via the corresponding user device:

obtaining, via said user device, the public identifier, device identifier, and character count of the corresponding rewritable memory device of said object;

transmitting the public identifier, device identifier, and character count to the computing system;

upon determining that the transmitted public identifier is complete:

upon determining that the transmitted public identifier matches any of the at least one public identifier stored in the at least one database, authenticating the transmitted public identifier;

upon determining that the transmitted public identifier does not match any of the at least one public identifier stored in the at least one database, invalidating the transmitted public identifier;

upon determining that the transmitted public identifier is incomplete:

identifying a first portion of the transmitted public identifier, said first portion consisting of an initial X successive characters contained in the transmitted public identifier, where X equals the character count;

upon determining that the first portion of the transmitted public identifier matches a corresponding first portion of at least one of the at least one public identifier stored in the at least one database:

identifying a second portion of the transmitted public identifier, said second portion consisting of any remaining characters of the transmitted public identifier;

comparing the second portion of the transmitted public identifier with the corresponding second portion of each previous public identifier associated with said at least one matched public identifier stored in the at least one database;

upon determining that the second portion of the transmitted public identifier matches a corresponding second portion of said at least one previous public identifier, authenticating the transmitted public identifier; and upon determining that the second portion of the transmitted public identifier does not match a corresponding second portion of any of said at least one previous public identifier, invalidating the transmitted public identifier; and upon determining that the first portion of the transmitted public identifier does not match a corresponding first portion of any of the at least one public identifier stored in the at least one database, invalidating the transmitted public identifier;

upon authenticating the transmitted public identifier:

transmitting select details related to said object, as stored in the at least one database, to said user device;

generating a new public identifier;

updating the public identifier and previous public identifier in the at least one database;

transmitting the new public identifier to said user device;

setting the character count of the corresponding rewritable memory device of said object to zero via said user device;

transmitting the new public identifier, via said user device, to said rewritable memory device; and sequentially incrementing said character count, via said user device, as each character of said new public identifier is successfully written to said rewritable memory device; and upon invaliding the transmitted public identifier, transmitting an error message to said user device.

2. The method of claim 1, wherein the step of determining that the transmitted public identifier is complete further comprises the steps of:

comparing the transmitted character count with a length of the transmitted public identifier; and upon determining that the transmitted character count is equal to the length of the transmitted public identifier, concluding that the transmitted public identifier is complete.

3. The method of claim 1, wherein the step of determining that the transmitted public identifier is incomplete further comprises the step of:

comparing the transmitted character count with a length of the transmitted public identifier; and upon determining that the transmitted character count is not equal to the length of the transmitted public identifier, concluding that the transmitted public identifier is incomplete.

4. The method of claim 1, wherein the step of determining that the transmitted public identifier matches any of the at least one public identifier stored in the at least one database, further comprises the steps of:

comparing the transmitted device identifier with the device identifier associated with said at least one matched public identifier stored in the at least one database;

upon determining that the transmitted device identifier matches the device identifier associated with said at least one matched public identifier, authenticating the transmitted public identifier; and upon determining that the transmitted device identifier does not match the device identifier associated with any of said at least one matched public identifier, invalidating the transmitted public identifier.

5. The method of claim 1, wherein the step of upon determining that the second portion of the transmitted public identifier matches a corresponding second portion of said at least one previous public identifier, further comprises the steps of:

comparing the transmitted device identifier with the device identifier associated with said at least one previous public identifier;

upon determining that the transmitted device identifier matches the device identifier associated with said at least one previous public identifier, authenticating the transmitted public identifier; and upon determining that the transmitted device identifier does not match the device identifier associated with any of said at least one previous public identifier, invalidating the transmitted public identifier.

6. The method of claim 1, further comprising the steps of, upon invaliding the transmitted public identifier:
   upon determining that the transmitted public identifier matches any of the at least one previous public identifier stored in the at least one database:
      comparing the transmitted device identifier with the device identifier associated with said at least one matched previous public identifier stored in the at least one database; and
      upon determining that the transmitted device identifier matches the device identifier associated with said at least one matched previous public identifier, flagging the public identifier and device identifier as compromised.

7. The method of claim 1, further comprising the steps of, upon authenticating the transmitted public identifier:
   upon determining that the transmitted public identifier has been flagged as compromised, transmitting an error message to said user device.

8. The method of claim 1, wherein the step of transmitting select details related to said object to said user device further comprises the step of transmitting at least one of an object name and an object image.

9. A method for dynamically authenticating an at least one object, the method comprising the steps of:
   implementing a central computing system configured for receiving and processing data related to the at least one object;
   implementing an at least one rewritable memory device attached to each of the at least one object, the at least one rewritable memory device configured for storing at least a unique public identifier, a unique device identifier, and a character count representing the number of characters of the public identifier successfully transmitted to the rewritable memory device;
   maintaining the public identifier, an at least one previous public identifier, and the device identifier of each of the at least one rewritable memory device, and select details related to the corresponding at least one object, in an at least one database in communication with the computing system;
   implementing a user application residing in memory on an at least one user device under the control of an at least one user, the at least one user device in selective communication with each of the computing system and the at least one rewritable memory device; and
   upon a one of the at least one user desiring to verify the authenticity of a one of the at least one object via the corresponding user device:
      obtaining, via said user device, the public identifier, device identifier, and character count of the corresponding rewritable memory device of said object;
      transmitting the public identifier, device identifier, and character count to the computing system;
      upon determining that the transmitted public identifier matches any of the at least one public identifier stored in the at least one database, authenticating the transmitted public identifier;
      upon determining that the transmitted public identifier does not match any of the at least one public identifier stored in the at least one database:
         identifying a first portion of the transmitted public identifier, said first portion consisting of an initial X successive characters contained in the transmitted public identifier, where X equals the character count;
         upon determining that the first portion of the transmitted public identifier matches a corresponding first portion of at least one of the at least one public identifier stored in the at least one database:
            identifying a second portion of the transmitted public identifier, said second portion consisting of any remaining characters of the transmitted public identifier;
            comparing the second portion of the transmitted public identifier with the corresponding second portion of each previous public identifier associated with said at least one matched public identifier stored in the at least one database;
            upon determining that the second portion of the transmitted public identifier matches a corresponding second portion of said at least one previous public identifier, authenticating the transmitted public identifier; and
            upon determining that the second portion of the transmitted public identifier does not match a corresponding second portion of any of said at least one previous public identifier, invalidating the transmitted public identifier; and
         upon determining that the first portion of the transmitted public identifier does not match a corresponding first portion of any of the at least one public identifier stored in the at least one database, invalidating the transmitted public identifier;
      upon authenticating the transmitted public identifier:
         upon determining that the transmitted public identifier has been flagged as compromised, transmitting an error message to said user device; and
         upon determining that the transmitted public identifier has not been flagged as compromised:
            transmitting select details related to said object, as stored in the at least one database, to said user device;
            generating a new public identifier;
            updating the public identifier and previous public identifier in the at least one database;
            transmitting the new public identifier to said user device;
            setting the character count of the corresponding rewritable memory device of said object to zero via said user device;
            transmitting the new public identifier, via said user device, to said rewritable memory device; and
            sequentially incrementing said character count, via said user device, as each character of said new public identifier is successfully written to said rewritable memory device; and
      upon invaliding the transmitted public identifier:
         upon determining that the transmitted public identifier matches any of the at least one previous public identifier stored in the at least one database:
            comparing the transmitted device identifier with the device identifier associated with said at least one matched previous public identifier stored in the at least one database; and
            upon determining that the transmitted device identifier matches the device identifier associated with said at least one matched previous public identifier, flagging the public identifier and device identifier as compromised; and transmitting an error message to said user device.

10. An authenticity verification system for dynamically authenticating an at least one object, the system comprising:
a central computing system configured for receiving and processing data related to the at least one object;
an at least one rewritable memory device attached to each of the at least one object, the at least one rewritable memory device configured for storing at least a unique public identifier, a unique device identifier, and a character count representing the number of characters of the public identifier successfully transmitted to the rewritable memory device;
an at least one database in communication with the computing system and configured for storing the public identifier, an at least one previous public identifier, and the device identifier of each of the at least one rewritable memory device, and select details related to the corresponding at least one object;
an at least one user device under the control of an at least one user and in selective communication with each of the computing system and the at least one rewritable memory device, the at least one user device providing a user application residing in memory thereon; and
wherein, upon a one of the at least one user desiring to verify the authenticity of a one of the at least one object via the corresponding user device, the system is configured for:
obtaining, via said user device, the public identifier, device identifier, and character count of the corresponding rewritable memory device of said object;
transmitting the public identifier, device identifier, and character count to the computing system;
upon determining that the transmitted public identifier is complete:
upon determining that the transmitted public identifier matches any of the at least one public identifier stored in the at least one database, authenticating the transmitted public identifier;
upon determining that the transmitted public identifier does not match any of the at least one public identifier stored in the at least one database, invalidating the transmitted public identifier;
upon determining that the transmitted public identifier is incomplete:
identifying a first portion of the transmitted public identifier, said first portion consisting of an initial X successive characters contained in the transmitted public identifier, where X equals the character count;
upon determining that the first portion of the transmitted public identifier matches a corresponding first portion of at least one of the at least one public identifier stored in the at least one database:
identifying a second portion of the transmitted public identifier, said second portion consisting of any remaining characters of the transmitted public identifier;
comparing the second portion of the transmitted public identifier with the corresponding second portion of each previous public identifier associated with said at least one matched public identifier stored in the at least one database;
upon determining that the second portion of the transmitted public identifier matches a corresponding second portion of said at least one previous public identifier, authenticating the transmitted public identifier; and
upon determining that the second portion of the transmitted public identifier does not match a corresponding second portion of any of said at least one previous public identifier, invalidating the transmitted public identifier; and
upon determining that the first portion of the transmitted public identifier does not match a corresponding first portion of any of the at least one public identifier stored in the at least one database, invalidating the transmitted public identifier;
upon authenticating the transmitted public identifier:
transmitting at least one of an object name and an object image related to said object, as stored in the at least one database, to said user device;
generating a new public identifier;
updating the public identifier and previous public identifier in the at least one database;
transmitting the new public identifier to said user device;
setting the character count of the corresponding rewritable memory device of said object to zero via said user device;
transmitting the new public identifier, via said user device, to said rewritable memory device; and
sequentially incrementing said character count, via said user device, as each character of said new public identifier is successfully written to said rewritable memory device; and
upon invaliding the transmitted public identifier, transmitting an error message to said user device.

11. The authenticity verification system of claim 10, wherein the at least one rewritable memory device is an RFID tag.

12. The authenticity verification system of claim 10, wherein the at least one user device provides an at least one user transceiver configured for selectively communicating with a corresponding memory transceiver of the at least one rewritable memory device.

13. The authenticity verification system of claim 12, wherein each of the user transceiver and memory transceiver utilize a near-field communication protocol.

14. The authenticity verification system of claim 10, wherein while determining that the transmitted public identifier is complete, the system is further configured for:
comparing the transmitted character count with a length of the transmitted public identifier; and
upon determining that the transmitted character count is equal to the length of the transmitted public identifier, concluding that the transmitted public identifier is complete.

15. The authenticity verification system of claim 10, wherein while determining that the transmitted public identifier is incomplete, the system is further configured for:
comparing the transmitted character count with a length of the transmitted public identifier; and
upon determining that the transmitted character count is not equal to the length of the transmitted public identifier, concluding that the transmitted public identifier is incomplete.

16. The authenticity verification system of claim 10, wherein while determining that the transmitted public identifier matches any of the at least one public identifier stored in the at least one database, the system is further configured for:

comparing the transmitted device identifier with the device identifier associated with said at least one matched public identifier stored in the at least one database;
upon determining that the transmitted device identifier matches the device identifier associated with said at least one matched public identifier, authenticating the transmitted public identifier; and
upon determining that the transmitted device identifier does not match the device identifier associated with any of said at least one matched public identifier, invalidating the transmitted public identifier.

17. The authenticity verification system of claim 10, wherein while determining that the second portion of the transmitted public identifier matches a corresponding second portion of said at least one previous public identifier, the system is further configured for:
comparing the transmitted device identifier with the device identifier associated with said at least one previous public identifier;
upon determining that the transmitted device identifier matches the device identifier associated with said at least one previous public identifier, authenticating the transmitted public identifier; and
upon determining that the transmitted device identifier does not match the device identifier associated with any of said at least one previous public identifier, invalidating the transmitted public identifier.

18. The authenticity verification system of claim 10, wherein upon invaliding the transmitted public identifier, the system is further configured for:
upon determining that the transmitted public identifier matches any of the at least one previous public identifier stored in the at least one database:
comparing the transmitted device identifier with the device identifier associated with said at least one matched previous public identifier stored in the at least one database; and
upon determining that the transmitted device identifier matches the device identifier associated with said at least one matched previous public identifier, flagging the public identifier and device identifier as compromised.

19. The authenticity verification system of claim 10, wherein upon authenticating the transmitted public identifier, the system is further configured for:
upon determining that the transmitted public identifier has been flagged as compromised, transmitting an error message to said user device.

20. The authenticity verification system of claim 10, wherein while transmitting select details related to said object to said user device, the system is further configured for transmitting at least one of an object name and an object image.

* * * * *